(12) United States Patent
Lee et al.

(10) Patent No.: US 9,258,826 B2
(45) Date of Patent: Feb. 9, 2016

(54) METHOD FOR TRANSMITTING AND RECEIVING SIGNAL BASED ON DYNAMIC CHANGE OF WIRELESS RESOURCE IN WIRELESS COMMUNICATION SYSTEM AND APPARATUS THEREFOR

(71) Applicant: LG ELECTRONICS INC., Seoul (KR)

(72) Inventors: Seungmin Lee, Anyang-si (KR); Hakseong Kim, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 78 days.

(21) Appl. No.: 14/360,578

(22) PCT Filed: Dec. 21, 2012

(86) PCT No.: PCT/KR2012/011267
§ 371 (c)(1),
(2) Date: May 23, 2014

(87) PCT Pub. No.: WO2013/095041
PCT Pub. Date: Jun. 27, 2013

(65) Prior Publication Data
US 2014/0348098 A1    Nov. 27, 2014

Related U.S. Application Data

(60) Provisional application No. 61/579,653, filed on Dec. 23, 2011.

(51) Int. Cl.
*H04L 12/26* (2006.01)
*H04W 4/00* (2009.01)
(Continued)

(52) U.S. Cl.
CPC ............ *H04W 72/14* (2013.01); *H04L 5/0055* (2013.01); *H04L 5/1469* (2013.01); *H04L 5/001* (2013.01); *H04L 5/0037* (2013.01); *H04L 5/0053* (2013.01); *H04W 72/0446* (2013.01)

(58) Field of Classification Search
CPC ....... H04L 1/1864; H04L 1/1896; H04L 5/00; H04L 5/001; H04L 5/003; H04L 5/0032; H04L 5/0037; H04L 5/0053; H04L 5/0055; H04L 5/1469; H04W 16/10; H04W 72/0446; H04W 72/0453; H04W 72/14; H04W 72/1278; H04W 74/002
USPC .......... 370/241–252, 310–350, 400–401, 431, 370/436, 464–465, 478–480; 455/431–466
See application file for complete search history.

(56) References Cited

U.S. PATENT DOCUMENTS 8,000,272 B2 * 8/2011 Gao ..................... H04W 72/14 370/280
8,565,167 B2 * 10/2013 Chen .................. H04W 72/0413 370/328

(Continued)

FOREIGN PATENT DOCUMENTS

| EP | 2339891 | 6/2011 |
|---|---|---|
| KR | 10-2011-0068807 | 6/2011 |
| KR | 10-2011-0132595 | 12/2011 |

OTHER PUBLICATIONS

PCT International Application No. PCT/KR2012/011267, Written Opinion of the International Searching Authority dated Apr. 8, 2013, 10 pages.

(Continued)

*Primary Examiner* — Tri H Phan
(74) *Attorney, Agent, or Firm* — Lee, Hong, Degerman, Kang & Waimey

(57) ABSTRACT

The present application relates to a method for enabling a terminal to transmit or receive a signal to or from a base station in a wireless communication system. Specifically, the method comprises the steps of: acquiring at least one amongst a downlink grant and an uplink grant in a specific sub-frame; determining the use of a dynamic sub-frame which is changeable for the dynamic use on the basis of the acquired grant information as one amongst an uplink transmission or a downlink reception; and transmitting or receiving the signal to or from the base station according to the determined use.

18 Claims, 14 Drawing Sheets

(51) Int. Cl.
  *H04L 12/28* (2006.01)
  *H04J 3/16* (2006.01)
  *H04J 4/00* (2006.01)
  *H04W 72/14* (2009.01)
  *H04L 5/14* (2006.01)
  *H04L 5/00* (2006.01)
  *H04W 72/04* (2009.01)

(56) References Cited

U.S. PATENT DOCUMENTS

| | | | | |
|---|---|---|---|---|
| 9,014,082 B2* | 4/2015 | Kim | ............ | H04L 5/00 370/315 |
| 9,031,028 B2* | 5/2015 | Kim | ............ | H04W 72/042 370/329 |
| 2011/0002276 A1 | 1/2011 | Chen et al. | | |
| 2011/0216724 A1 | 9/2011 | Zhao et al. | | |
| 2013/0028205 A1* | 1/2013 | Damnjanovic | ............ | H04L 5/001 370/329 |
| 2013/0083753 A1* | 4/2013 | Lee | ............ | H04W 72/0453 370/329 |
| 2013/0121191 A1* | 5/2013 | Song | ............ | H04J 11/0056 370/252 |
| 2014/0086116 A1* | 3/2014 | Seo | ............ | H04W 72/14 370/280 |
| 2014/0098774 A1* | 4/2014 | Gao | ............ | H04L 5/001 370/329 |

OTHER PUBLICATIONS

PCT International Application No. PCT/KR2012/011267, Written Opinion of the International Searching Authority dated Apr. 8, 2013, 12 pages.

\* cited by examiner

FIG. 2
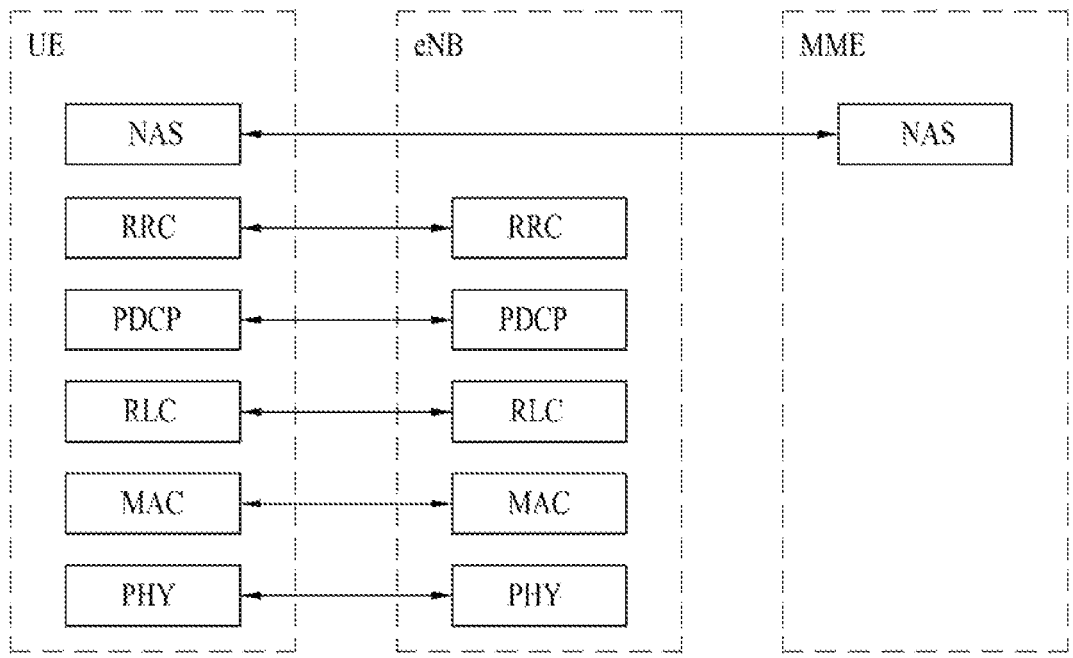
(a) Control-plane protocol stack
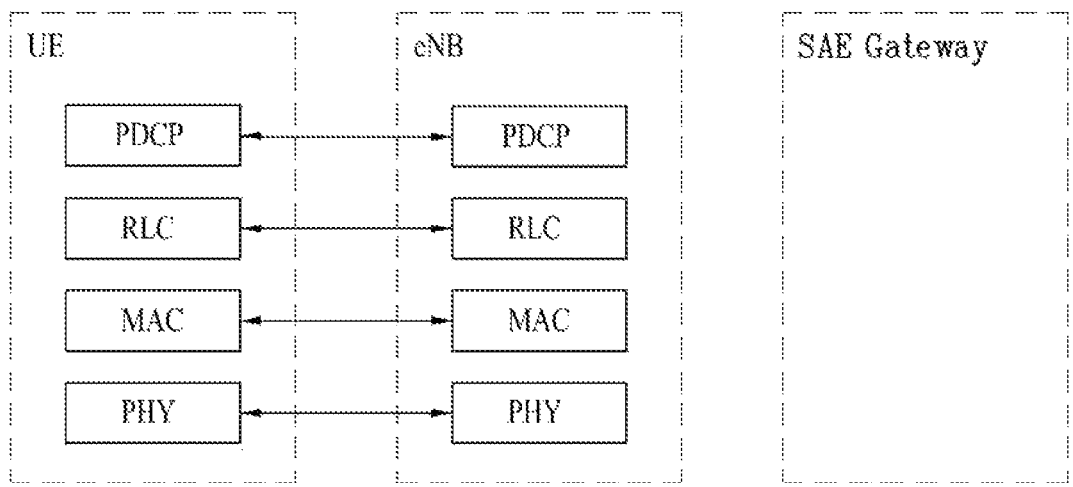
(b) User-plane protocol stack

METHOD FOR TRANSMITTING AND RECEIVING SIGNAL BASED ON DYNAMIC CHANGE OF WIRELESS RESOURCE IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2012/011267, filed on Dec. 21, 2012, which claims the benefit of U.S. Provisional Application Ser. No. 61/579,653, filed on Dec. 23, 2011, the contents of which are hereby incorporated by reference herein in their entirety.

TECHNICAL FIELD

The present invention relates to a wireless communication system and, more particularly, to a method for transmitting and receiving a signal based on dynamic change in wireless resources in a wireless communication system.

BACKGROUND ART

As an example of a wireless communication system to which the present invention is applicable, a $3^{rd}$ Generation Partnership Project (3GPP) Long Term Evolution (LTE) communication system will be schematically described.

FIG. 1 is a diagram showing a network structure of an Evolved Universal Mobile Telecommunications System (E-UMTS) as a wireless communication system. The E-UMTS is an evolved form of the UMTS and has been standardized in the 3GPP. Generally, the E-UMTS may be called a Long Term Evolution (LTE) system. For details of the technical specifications of the UMTS and E-UMTS, refer to Release 7 and Release 8 of "$3^{rd}$ Generation Partnership Project; Technical Specification Group Radio Access Network".

Referring to FIG. 1, the E-UMTS mainly includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist per eNB. The cell is set to use a bandwidth such as 1.25, 2.5, 5, 10, 15 or 20 MHz to provide a downlink or uplink transmission service to several UEs. Different cells may be set to provide different bandwidths. The eNB controls data transmission or reception of a plurality of UEs. The eNB transmits downlink (DL) scheduling information of DL data so as to inform a corresponding UE of time/frequency domain in which data is transmitted, coding, data size, and Hybrid Automatic Repeat and reQest (HARQ)-related information. In addition, the eNB transmits uplink (UL) scheduling information of UL data to a corresponding UE so as to inform the UE of a time/frequency domain which may be used by the UE, coding, data size and HARQ-related information. An interface for transmitting user traffic or control traffic can be used between eNBs. A Core Network (CN) may include an AG, a network node for user registration of the UE, etc. The AG manages mobility of a UE on a Tracking Area (TA) basis. One TA includes a plurality of cells.

Although wireless communication technology has been developed up to Long Term Evolution (LTE) based on Wideband Code Division Multiple Access (WCDMA), the demands and the expectations of users and providers continue to increase. In addition, since other radio access technologies have been continuously developed, new technology evolution is required to secure high competitiveness in the future. Decrease in cost per bit, increase in service availability, flexible use of a frequency band, simple structure, open interface, suitable User Equipment (UE) power consumption and the like are required.

DISCLOSURE

Technical Problem

An object of the present invention devised to solve the problem lies in a method for transmitting and receiving a signal based on dynamic change in wireless resources in a wireless communication system.

Technical Solution

The object of the present invention can be achieved by providing a method for, at a user equipment, transmitting and receiving a signal to and from a base station in a wireless communication system, including acquiring at least one of downlink grant and uplink grant in a specific subframe, determining use of a dynamic subframe, which is dynamically changeable, as one of uplink transmission or downlink reception based on the acquired grant information, and transmitting and receiving the signal to and from the base station according to the determined use.

The determining the use of the dynamic subframe may include determining the use of the dynamic subframe as downlink reception when the downlink grant is acquired in the specific subframe. In this case, when an index of the dynamic subframe is n, an index m of the specific subframe may be at least one of m, n or n−1.

The determining the use of the dynamic subframe may include determining the use of the dynamic subframe as uplink reception when the uplink grant is acquired in the specific subframe. In this case, when an index of the dynamic subframe is n, an index m of the specific subframe may be n−4.

When the specific subframe is the dynamic subframe, the specific subframe may be determined as downlink reception in advance. The specific subframe is determined to be used for downlink by a system information block (SIB).

The method may further include receiving pattern information of the dynamic subframe, the use of which is dynamically changeable, from the base station. In this case, the pattern information of the dynamic subframe may be received via one of a system information block (SIB), radio resource control (RRC) layer signaling and physical layer signaling.

In another aspect of the present invention, there is provided a user equipment (UE) apparatus in a wireless communication system, including a wireless communication module configured to transmit and receive a signal to and from a base station, and a processor configured to process the signal, wherein the processor acquires at least one of downlink grant and uplink grant in a specific subframe and determines use of a dynamic subframe, which is dynamically changeable, as one of uplink transmission or downlink reception based on the acquired grant information, and controls the wireless communication module to transmit and receive the signal to and from the base station according to the determined use.

The processor determines the use of the dynamic subframe as downlink reception when the downlink grant is acquired in the specific subframe and determines the use of the dynamic subframe as uplink reception when the uplink grant is acquired in the specific subframe.

The wireless communication module may receive pattern information of the dynamic subframe, the use of which is dynamically changeable, from the base station.

Advantageous Effects

According to the embodiments of the present invention, a user equipment (UE) and a base station can efficiently transmit and receive a signal while dynamically changing radio resources in a wireless communication system.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

FIG. 2 is a diagram showing a control plane and a user plane of a radio interface protocol architecture between a User Equipment (UE) and an Evolved Universal Terrestrial Radio Access Network (E-UTRAN) based on a $3^{rd}$ Generation Partnership Project (3GPP) radio access network standard.

BEST MODE

Figure 1:
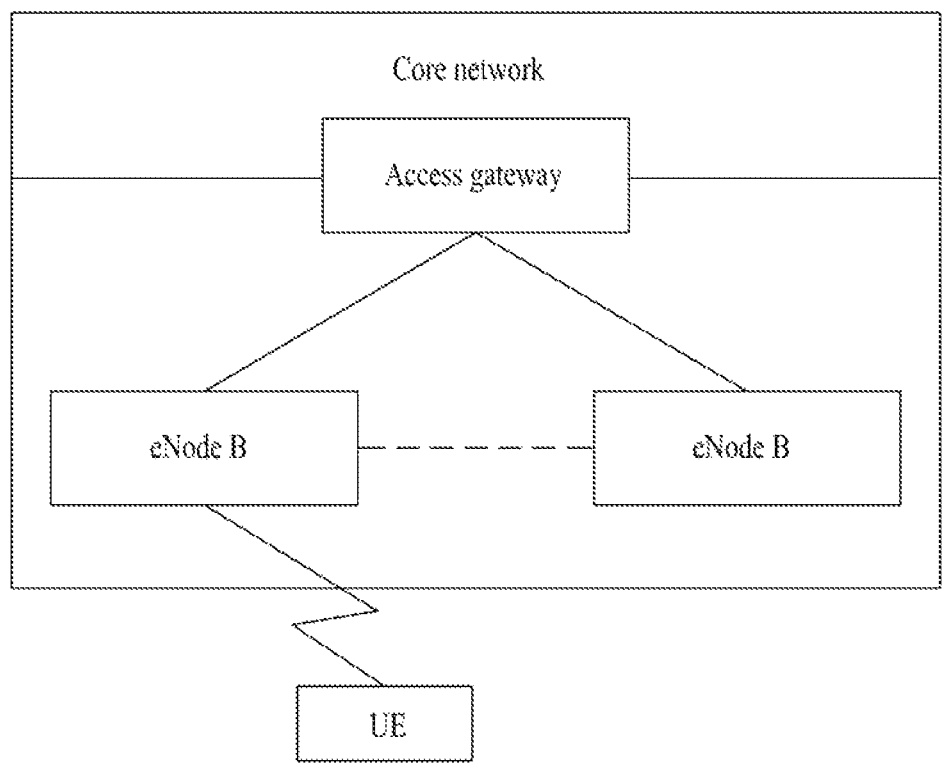
FIG. 1 is a diagram showing a network structure of an Evolved Universal Mobile Telecommunications System (E-UMTS) as an example of a wireless communication system.

The configuration, operation and other features of the present invention will be understood by the embodiments of the present invention described with reference to the accompanying drawings. The following embodiments are examples of applying the technical features of the present invention to a $3^{rd}$ Generation Partnership Project (3GPP) system.

Although, for convenience, the embodiments of the present invention are described using the LTE system and the LTE-A system in the present specification, the embodiments of the present invention are applicable to any communication system corresponding to the above definition.

FIG. 2 shows a control plane and a user plane of a radio interface protocol between a UE and an Evolved Universal Terrestrial Radio Access Network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer of a first layer provides an information transfer service to a higher layer using a physical channel. The PHY layer is connected to a Medium Access Control (MAC) layer located on a higher layer via a transport channel. Data is transported between the MAC layer and the PHY layer via the transport channel. Data is also transported between a physical layer of a transmitting side and a physical layer of a receiving side via a physical channel. The physical channel uses a time and a frequency as radio resources. More specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A Medium Access Control (MAC) layer of a second layer provides a service to a Radio Link Control (RLC) layer of a higher layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 packet or an IPv6 packet in a radio interface having a relatively small bandwidth.

A Radio Resource Control (RRC) layer located at the bottom of a third layer is defined only in the control plane and is responsible for control of logical, transport, and physical channels in association with configuration, re-configuration, and release of Radio Bearers (RBs). The RB is a service that the second layer provides for data communication between the UE and the network. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located above the RRC layer performs functions such as session management and mobility management.

One cell of the eNB is set to use a bandwidth such as 1.25, 2.5, 5, 10, 15 or 20 MHz to provide a downlink or uplink transmission service to several UEs. Different cells may be set to provide different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
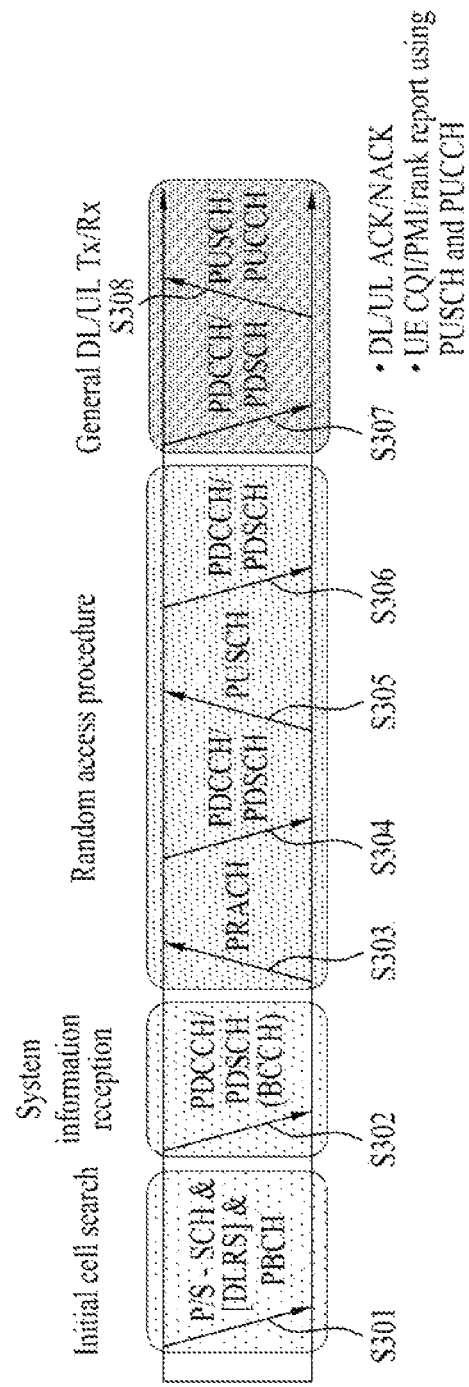
FIG. 3 is a diagram showing physical channels used in a 3GPP system and a general signal transmission method using the same.

FIG. 3 is a diagram showing physical channels used in a 3GPP system and a general signal transmission method using the same.

A UE performs an initial cell search operation such as synchronization with an eNB when power is turned on or the UE enters a new cell (S301). The UE may receive a Primary Synchronization Channel (P-SCH) and a Secondary Synchronization Channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DL RS) so as to confirm a downlink channel state in the initial cell search step.

The UE, which has completed the initial cell search, may receive a Physical Downlink Control Channel (PDCCH) and a Physical Downlink Shared Channel (PDSCH) according to information included in the PDCCH so as to acquire more detailed system information (S302).

Meanwhile, if the eNB is initially accessed or radio resources for signal transmission are not present, the UE may perform a Random Access Procedure (RACH) (step S303 to S306) with respect to the eNB. In this case, the UE may transmit a specific sequence through a Physical Random Access Channel (PRACH) as a preamble (S303 and S305), and receive a response message of the preamble through the PDCCH and the PDSCH corresponding thereto (S404 and S306). In the case of contention-based RACH, a contention resolution procedure may be further performed.

The UE, which has performed the above procedures, may perform PDCCH/PDSCH reception (S307) and Physical Uplink Shared Channel PUSCH)/Physical Uplink Control Channel (PUCCH) transmission (S308) as a general uplink/downlink signal transmission procedure. In particular, the UE receives downlink control information (DCI) through a PDCCH. Here, the DCI includes control information such as resource allocation information of the UE and the format thereof differs according to the use purpose.

The control information transmitted from the UE to the eNB in uplink or transmitted from the eNB to the UE in downlink includes a downlink/uplink ACK/NACK signal, a Channel Quality Indicator (CQI), a Precoding Matrix Index (PMI), a Rank Indicator (RI), and the like. In the case of the 3GPP LTE system, the UE may transmit the control information such as CQI/PMI/RI through the PUSCH and/or the PUCCH.

Figure 4:
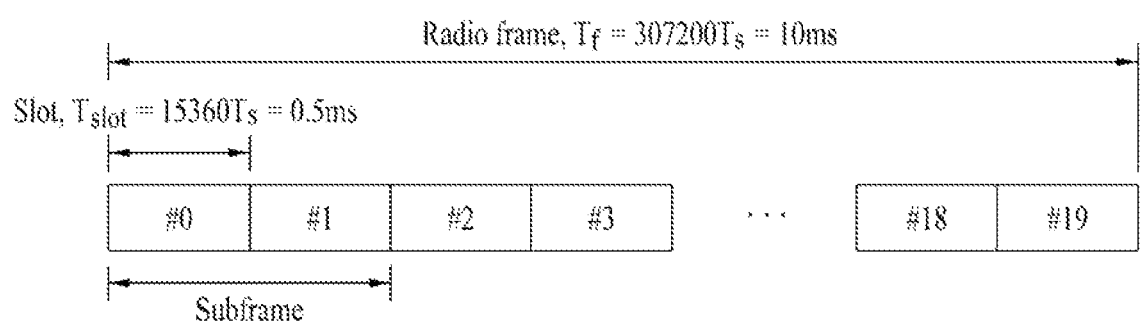
FIG. 4 is a diagram showing the structure of a radio frame used in a Long Term Evolution (LTE) system.

FIG. 4 is a diagram showing the structure of a radio frame used in a Long Term Evolution (LTE) system.

Referring to FIG. 4, the radio frame has a length of 10 ms ($327200 \times T_s$) and includes 10 subframes with the same size. Each of the subframes has a length of 1 ms and includes two slots. Each of the slots has a length of 0.5 ms ($15360 \times T_s$). $T_s$ denotes a sampling time, and is represented by $T_s=1/(15 \text{ kHz} \times 2048)=3.2552 \times 10^{-8}$ (about 33 ns). Each slot includes a plurality of OFDM symbols in a time domain, and includes a plurality of resource blocks (RBs) in a frequency domain. In the LTE system, one RB includes 12 subcarriers×7(6) OFDM or SC-FDMA symbols. A Transmission Time Interval (TTI) which is a unit time for transmission of data may be determined in units of one or more subframes. The structure of the radio frame is only exemplary and the number of subframes included in the radio frame, the number of slots included in the subframe, or the number of OFDM symbols included in the slot may be variously changed.

Figure 5:
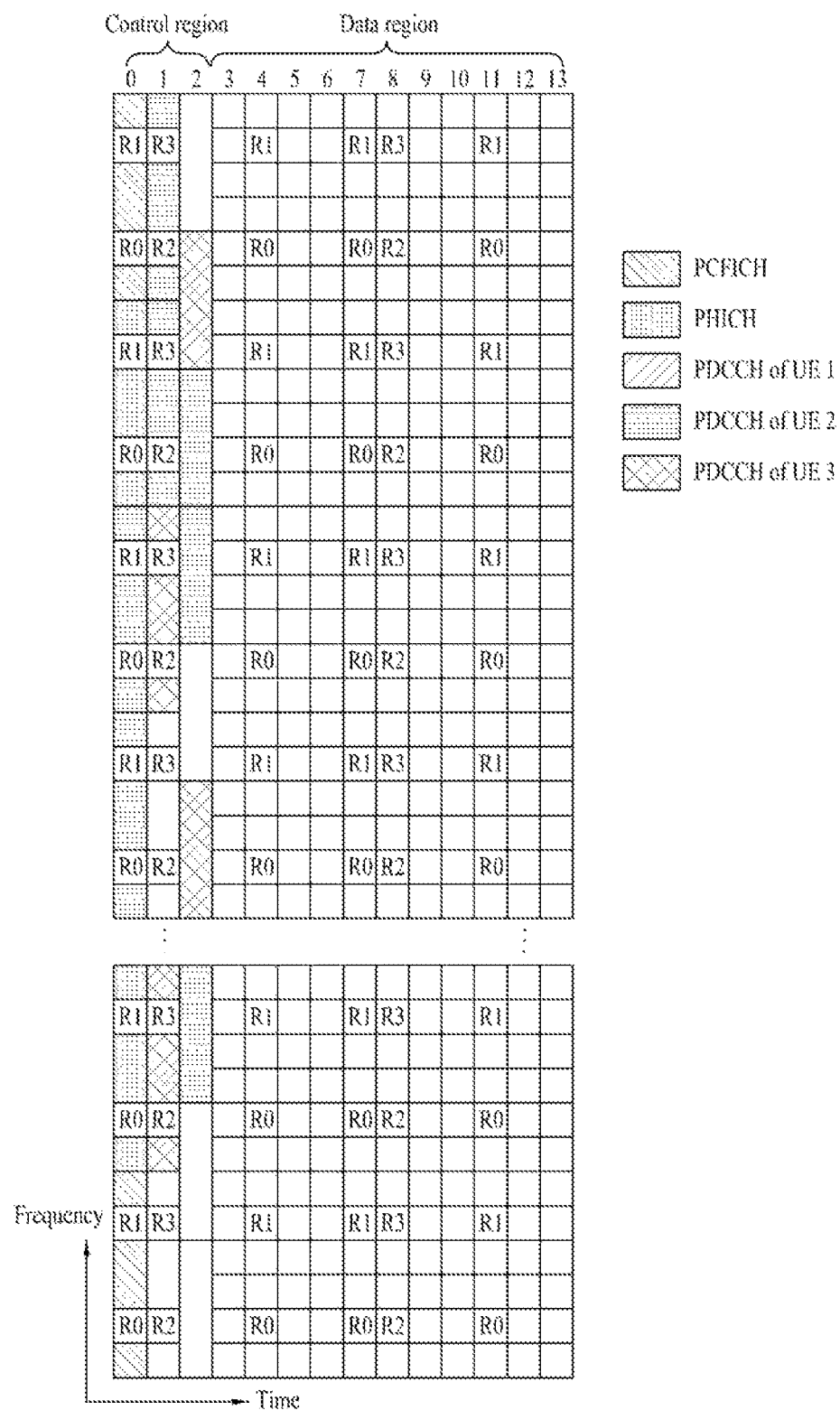
FIG. 5 is a diagram showing the structure of a downlink radio frame used in an LTE system.

FIG. 5 is a diagram showing a control channel included in a control region of one subframe in a downlink radio frame.

Referring to FIG. 5, a subframe includes 14 OFDM symbols. The first to third OFDM symbols are used as a control region and the remaining 13 to 11 OFDM symbols are used as a data region, according to subframe configuration. In FIG. 5, R1 to R4 denote reference signals (RS) or pilot signals for antennas 0 to 3. The RS is fixed to a constant pattern within a subframe regardless of the control region and the data region. A control channel is allocated to resources, to which the RS is not allocated, in the control region, and a traffic channel is also allocated to resources, to which the RS is not allocated, in the control region. Examples of the control channel allocated to the control region include a Physical Control Format Indicator Channel (PCFICH), a Physical Hybrid-ARQ Indicator Channel (PHICH), a Physical Downlink Control Channel (PDCCH), etc.

The Physical Control Format Indicator Channel (PCFICH) informs the UE of the number of OFDM symbols used for the PDCCH per subframe. The PCFICH is located at a first OFDM symbol and is configured prior to the PHICH and the PDCCH. The PCFICH includes four Resource Element Groups (REGs) and the REGs are dispersed in the control region based on a cell identity (ID). One REG includes four resource elements (REs). The PCFICH has a value of 1 to 3 or 2 to 4 according to bandwidth and is modulated using a Quadrature Phase Shift Keying (QPSK) scheme.

The Physical Hybrid-ARQ Indicator Channel (PHICH) is used to carry HARQ ACK/NACK for uplink transmission. That is, the PHICH refers to a channel via which DL ACK/NACK information for uplink HARQ is transmitted. The PHICH includes one REG and is scrambled on a cell-specific basis. ACK/NACK is indicated by one bit and is modulated using a binary phase shift keying (BPSK) scheme. The modulated ACK/NACK is repeatedly spread with a spreading factor (SF) of 2 or 4. A plurality of PHICHs mapped to the same resources configures a PHICH group. The number of PHICHs multiplexed in the PHICH group is determined according to the number of spreading codes. The PHICH (group) is repeated three times in order to obtain diversity gain in a frequency region and/or time region.

The Physical Downlink Control Channel (PDCCH) is allocated to the first n OFDM symbols of a subframe. Here, n is an integer of 1 or more and is indicated by a PCFICH. The PDCCH includes one or more Control Channel Elements (CCEs). The PDCCH informs each UE or a UE group of information associated with resource allocation of a Paging Channel (PCH) and a Downlink-Shared Channel (DL-SCH), both of which are transport channels, uplink scheduling grant, HARQ information, etc. The paging channel (PCH) and the downlink-shared channel (DL-SCH) are transmitted through a PDSCH. Accordingly, the eNB and the UE transmit and receive data through the PDSCH except for specific control information or specific service data.

Information indicating to which UE (one or a plurality of UEs) data of the PDSCH is transmitted and information indicating how the UEs receive and decode the PDSCH data are transmitted in a state of being included in the PDCCH. For example, it is assumed that a specific PDCCH is CRC-masked with a Radio Network Temporary Identity (RNTI) "A", and information about data transmitted using radio resource (e.g., frequency location) "B" and transmission format information (e.g., transmission block size, modulation scheme, coding information, or the like) "C" is transmitted via a specific subframe. In this case, one or more UEs located within a cell monitor a PDCCH using its own RNTI information, and if one or more UEs having "A" RNTI are present, the UEs receive the PDCCH and receive the PDSCH indicated by "B" and "C" through the information about the received PDCCH.

Figure 6:
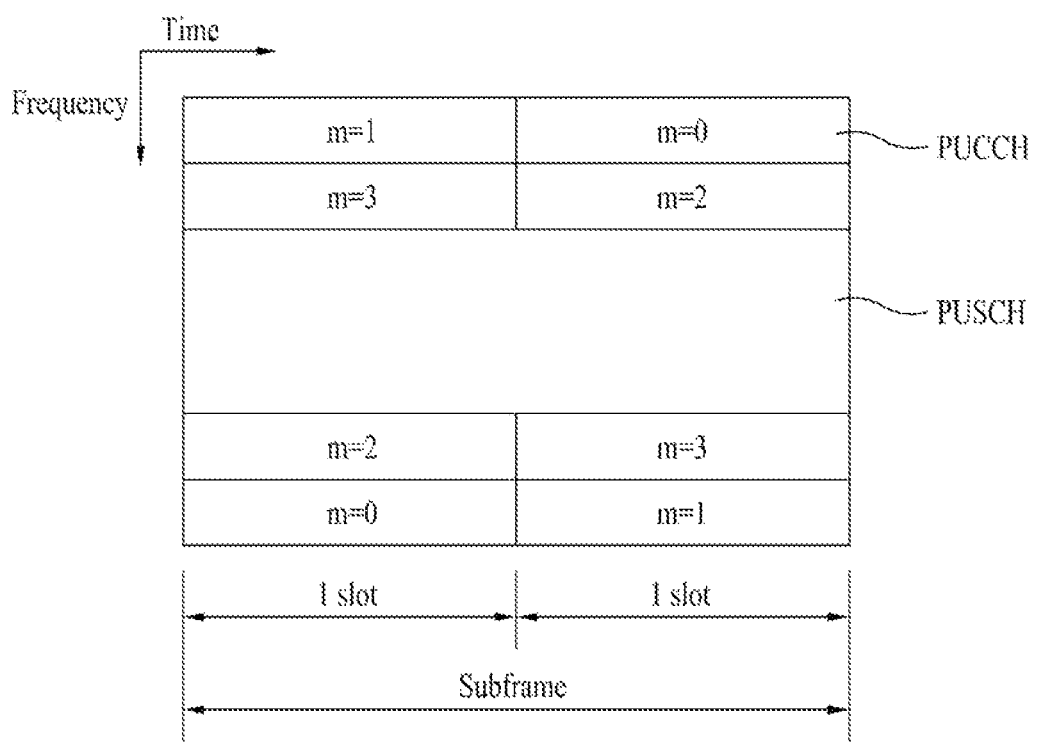
FIG. 6 is a diagram showing the structure of an uplink subframe used in an LTE system.

FIG. 6 is a diagram showing the structure of an uplink subframe used in an LTE system.

Referring to FIG. 6, an uplink subframe may be divided into a region to which a Physical Uplink Control Channel (PUCCH) carrying uplink control information is allocated and a region to which a Physical Uplink Shared Channel (PUSCH) carrying user data is allocated. A middle portion of the subframe is allocated to the PUSCH and both sides of a data region in a frequency domain are allocated to the PUCCH. Uplink control information transmitted on the PUCCH includes an ACK/NACK signal used for HARQ, a Channel Quality Indicator (CQI) indicating a downlink channel status, a rank indicator (RI) for MIMO, a scheduling request (SR) which is an uplink radio resource allocation request, etc. The PUCCH for one UE uses one resource block occupying different frequencies in slots within the subframe. Two slots use different resource blocks (or subcarriers) within the subframe. That is, two resource blocks allocated to the PUCCH are frequency-hopped in a slot boundary. FIG. 6 shows the case in which a PUCCH having m=0, a PUCCH having m=1, a PUCCH having m=2, and a PUCCH having m=3 are allocated to the subframe.

Hereinafter, a carrier aggregation (CA) scheme will be described.

Carrier aggregation refers to a method of, at a UE, utilizing a plurality of frequency blocks or cells (in a logical sense) composed of uplink resources (or component carriers) and/or downlink resources (or component carriers) as a large logical frequency bandwidth in order to use a wider frequency bandwidth in a wireless communication system. Hereinafter, for convenience of description, the term "component carrier" will be used.

An entire system bandwidth (BW) is a logical bandwidth having a maximum bandwidth of 100 MHz. The entire system bandwidth includes five component carriers (CCs) and each CC has a maximum bandwidth of 20 MHz. The CC includes one or more physically contiguous subcarriers. CCs may have the same bandwidth or different bandwidths. Although CCs are shown as being adjacent to each other in the frequency domain in the logical concept, the CCs may be physically adjacent to or separated from each other.

Different center frequencies may be used for the CCs or one common center frequency may be used for physically adjacent CCs. For example, if it is assumed that all CCs are physically adjacent, a center frequency A may be used. If it is assumed that CCs are not physically adjacent, a center frequency A, a center frequency B and the like may be used for the respective CCs.

In the present specification, the CC may correspond to a system bandwidth of a legacy system. By defining the CC based on the legacy system, it is possible to provide backward compatibility and to facilitate system design in a radio communication environment in which an evolved UE and a legacy UE coexist. For example, if the LTE-A system supports carrier aggregation, each CC may correspond to the system bandwidth of the LTE system. In this case, the CC may have any one bandwidth such as 1.25, 2.5, 5, 10 or 20 MHz.

In the case in which the entire system bandwidth is extended by carrier aggregation, a frequency bandwidth used for communication with each UE is defined in CC units. A UE A may use 100 MHz which is the entire system bandwidth and perform communication using all five CCs. Each of UEs $B_1$ to $B_5$ may only use a bandwidth of 20 MHz and perform communication using one CC. Each of UEs $C_1$ and $C_2$ may use a bandwidth of 40 MHz and perform communication using two CCs. The two CCs may or may not be logically or physically adjacent. The UE $C_1$ uses two non-adjacent CCs and the UE $C_2$ uses two adjacent CCs.

Figure 8:
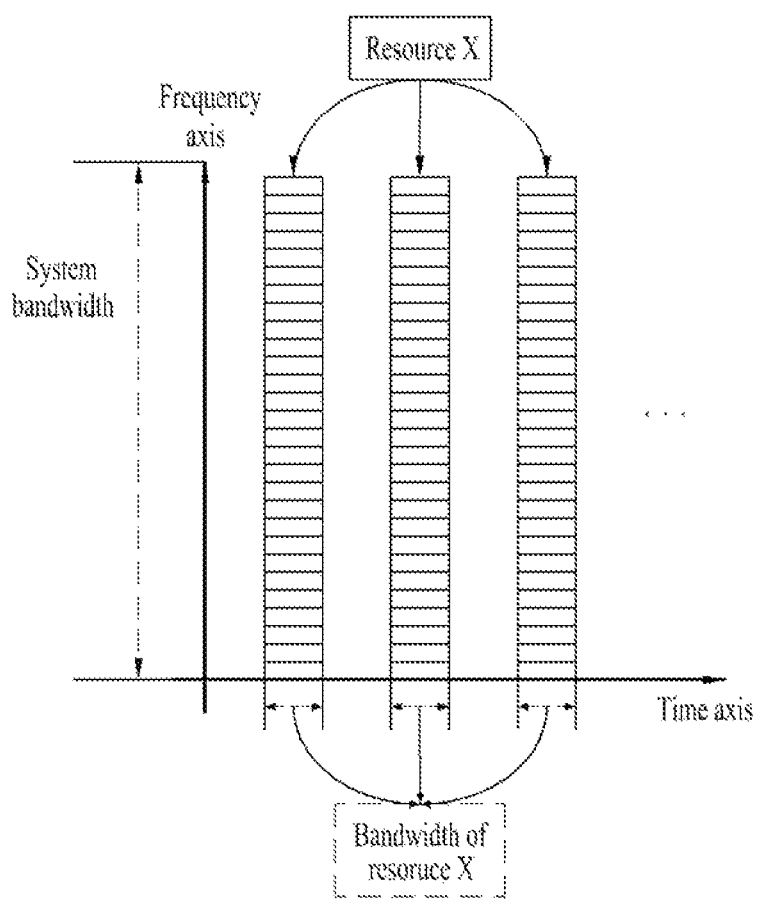

While one downlink CC and one uplink component are used in the LTE system, several component carriers may be used in the LTE-A system as shown in FIG. 8. At this time, a method of scheduling a data channel by a control channel may be divided into a linked carrier scheduling method and a cross carrier scheduling method.

More specifically, in the linked carrier scheduling method, similarly to the LTE system using a single CC, a control channel transmitted via a specific CC schedules only a data channel via the specific CC.

In contrast, in the cross carrier scheduling method, a control channel transmitted via a primary CC using a carrier indicator field (CIF) schedules a data channel transmitted via the primary CC or another CC.

First, an uplink-downlink configuration defined in a TDD system based on a 3GPP LTE system will be described prior to a detailed description of a proposed method.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D, U and S respectively allocated to subframe numbers denote a downlink subframe, an uplink subframe and a special subframe, respectively. In addition, Table 2 below shows uplink subframe numbers (indices) for transmitting uplink ACK/NACK for downlink signals at a UE in a TDD system based on a 3GPP LTE system.

TABLE 2

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | 4 | 7 | — | — | — | 9 | 2 | — | — | — |
| 1 | 7 | 7 | — | — | 8 | 2 | 2 | — | — | 3 |
| 2 | 7 | 7 | — | 7 | 2 | 2 | 2 | — | 2 | 7 |
| 3 | 4 | 2 | — | — | — | 2 | 2 | 3 | 3 | 4 |
| 4 | 2 | 2 | — | — | 2 | 2 | 3 | 3 | 3 | 3 |
| 5 | 2 | 2 | — | 2 | 2 | 2 | 2 | 2 | 2 | 2 |
| 6 | 7 | 8 | — | — | — | 2 | 3 | — | — | 4 |

In particular, in Table 2, "-" denotes that a subframe is set as an uplink subframe and numeral allocated to each subframe number denotes an uplink subframe index, that is, an uplink subframe index linked to a downlink subframe.

Hereinafter, dynamic change in radio resource of the present invention will be described.

In the present invention, an eNB dynamically changes and uses radio resource, the use of which is not fixed, as a downlink resource or uplink resource according to change in downlink/uplink traffic load in a system. In particular, the eNB may notify a UE of information about the use of the resource via the following various methods.

For convenience of description, radio resource, the use of which is not fixed, that is, dynamic resource, is "resource X" and the eNB may allocate resource X to all or some of UEs or grouped UEs communicating therewith.

Figure 7:
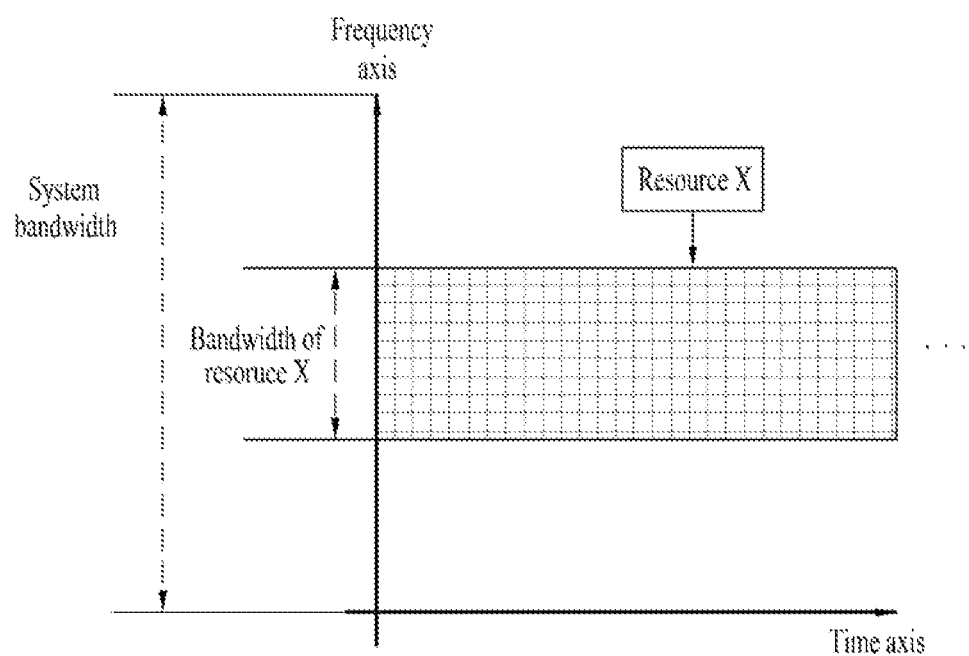
FIGS. 7 to 9 are schematic diagrams illustrating the concepts of a radio resource configuration or form defined by radio resource, use of which is not fixed.
Figure 9:
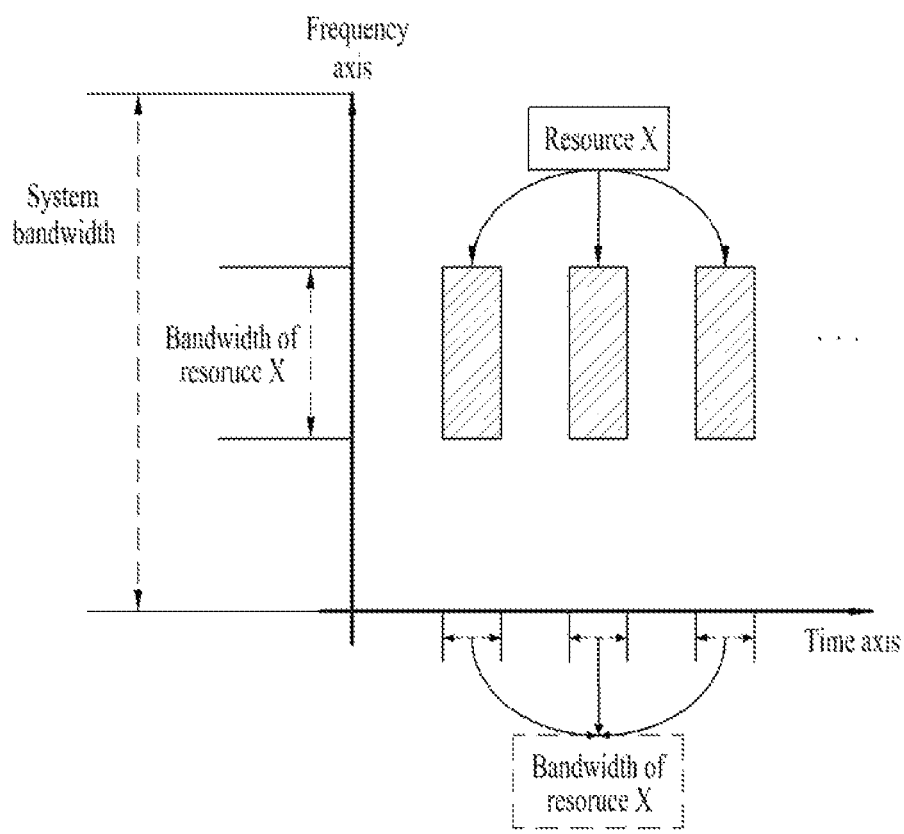

FIGS. 7 to 9 are schematic diagrams illustrating the concepts of a radio resource configuration or form defined as radio resources, the use of which is not fixed. In particular, FIG. 7 shows an example of a method of defining resource X in the frequency domain, and FIG. 8 shows an example of a method of defining resource X in the time domain. FIG. 9 shows an example of a method of defining resource X in the time-frequency domain.

Meanwhile, in addition to bandwidth and time interval of the resource X, various values may be set. For example, in the resource X in the frequency domain of FIG. 7, existing band or additionally allocated band (e.g., component carriers (cells) in a carrier aggregation scheme) may be used as the resource X.

In addition, in the resource X in the time domain of FIG. 8, existing system band may be divided into predefined time intervals (for example, 1 ms (that is, one subframe) or 0.5 ms (that is, 1 slot)) and some of the time intervals may be set and used as resource X.

Additionally, in the resource X in the time-frequency domain of FIG. 9, existing band (e.g., component carriers (cells) in a carrier aggregation scheme) or additionally allocated band may be divided into predefined time intervals (for example, 1 ms (that is, one subframe) or 0.5 ms (that is, 1 slot) and some of the time intervals may be used as the resource X.

Figure 10:
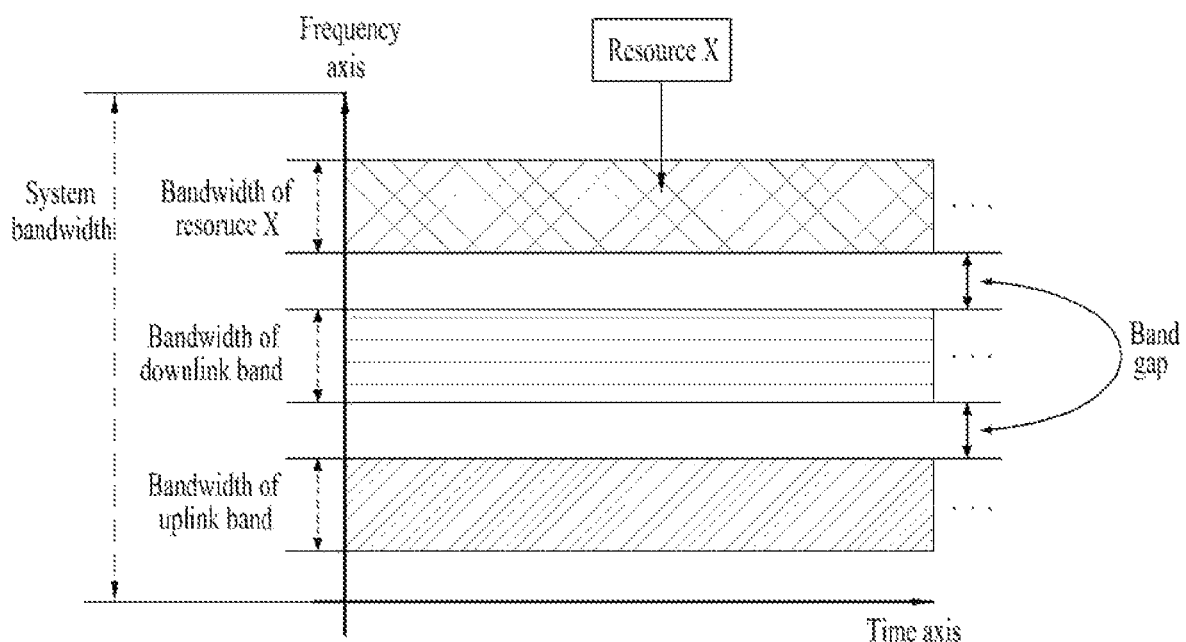
FIG. 10 is a diagram showing the case in which bandwidth defined as resource X is additionally allocated to existing bandwidth.

The configuration and form of the resource X of the present invention are not limited to FIGS. 7 to 9 and may be defined as a combination of resources X in the frequency domain, the time domain and the time-frequency domain (e.g., a combination of FIGS. 7 and 8, a combination of FIGS. 8 and 9, etc.). The eNB may notify the UE of a plurality of resources. FIG. 10 shows the case in which a band defined as resource X is additionally allocated in an existing band.

First Embodiment

First, as a method of, at an eNB, allocating resource X to a UE, the UE may be notified of allocation and configuration information of radio resource, the use of which is not fixed, via a system information block (SIB), additional (dedicated) RRC signaling or PDCCH (or ePDCCH). Here, the ePDCCH is a control channel recently discussed in the 3GPP standard and refers to a control channel transmitted via a PDCCH region in order to overcome capacity shortage of an existing PDCCH.

In particular, in the time domain, information on resource X transmitted from the eNB to the UE may be in the form of a bitmap indicating the use of a specific time interval (e.g., "00"->downlink subframe (DL SF), "01"->uplink subframe (UL SF), "10"->X SF) or in the form of a bit indicating a configuration of specific resource X after configuration information of one or a plurality of resources X has been shared between the eNB and the UE in advance.

As another method, in order to change resource, the use of which is set or fixed via an SIB (e.g., downlink resource or uplink resource), to resource X, the eNB may notify the UE of resource in the form of a bitmap. For example, when uplink-downlink configuration #0 (that is, DSUUUDSUUU) is set via the SIB in a TDD system and a bitmap meaning change to the resource X is set to "0111001110", the configuration of a final SF becomes "DXXXUDXXXU".

The above-described methods may be extended and applied to the case in which, when the resource X is configured in the frequency domain, entire system bandwidth is divided by a predefined (virtual) size and the eNB notifies the UE of the region used as the resource X. In addition, the above-described methods are equally extended and applied to the case in which the resource X is configured in the time-frequency domain.

Hereinafter, in order for the eNB to notify the UE whether radio resource (that is, resource X), the use of which is not fixed, is set to a downlink resource or uplink resource, an implementation based on DL grant or UL grant detection will be described. Hereinafter, for convenience of description, assume that resource X is SF #n.

First, the eNB transmits DL grant or UL grant via a PDCCH (or ePDCCH) on SF #m (m<=n). If the DL grant or UL grant is detected via blind decoding of the PDCCH (or ePDCCH) region (e.g., a UE-specific search space (USS) or a common search space (CSS)), the UE may regard the use of resource X (that is, SF #n) as a downlink resource or uplink resource and use scheduling information.

The PDCCH (or ePDCCH), via which the DL grant or UL grant is transmitted, may be transmitted via an existing band (e.g., the use of which is set based on an SIB or MIB or the use of which is set or fixed based on (dedicated) RRC signaling) or may be transmitted via bandwidth additionally allocated to be used as resource X.

In addition, the following method may be used when notifying the UE of use and scheduling information of the resource X via a PDCCH (or ePDCCH) at a specific time (that is, SF #m). Here, a band used to transmit the DL grant or UL grant indicating use and scheduling information of the resource X and a band set as the resource X may be differently defined. In addition, the specific time may be a predetermined time or a flexible time.

1) First, the UE may be notified of use and scheduling information of the resource X using a specific field of the PDCCH (or ePDCCH). For example, a value of a carrier indication field (CIF), downlink assignment index (DAI) or UL index may be used according to a predetermined rule. In addition, in a specific transmission mode, the eNB may notify the UE that the DL grant or UL grant indicates use and scheduling information of the resource X using a combination of specific fields included in a DCI format or a combination of a specific field and physical/higher layer signaling.

2) In addition, the range of a time (e.g., DL SF #m) when the DL grant or UL grant indicating use and scheduling information of the resource X at the specific time (that is, SF #n) is received may be restricted to a specific value. For example, "m=n" or "m=(n−1)" or "m=n and m=(n−1) in case of DL grant and "m=(n−4)" in case of UL grant. Other values may be set in advance. For example, in a TDD system, in order for the eNB to notify the UE of transmission timing information of use and scheduling information (that is, DL/UL grant) of the resource X at the specific time, representative uplink-downlink configuration information may be set to be signaled via a predetermined higher layer signal or physical layer signal.

3) When DL grant or UL grant indicating use and scheduling information of the resource X at the specific time (that is, SF #n) is transmitted via the PCCCH (or ePDCCH) of SF #m ("m=n" or "m=(n−1)" or "m=n and m=(n−1) in case of DL grant and "m=(n−4)" in case of UL grant), SF #m (at least one of SF #m in a preset specific range) may be preset to be used as a downlink resource. For example, if both SF #n and SF#m are resource X and DL grant or UL grant indicating use and scheduling information of the resource X of SF #n is transmitted on SF #m, SF #m may be set to be used as a downlink resource in order to perform such operation.

4) DL SF #m on which DL grant or UL grant is transmitted may be restricted to an SF (at a specific time), which is not resource X, that is, the use of which is set or fixed to a DL SF based on the SIB, resource X (at a specific time) used as a DL SF, or resource X (at a specific time) used as a DL SF and a DL SF (at a specific time), the use of which is set or fixed based on the SIB. In addition, DL SF #m on which DL grant or UL grant is transmitted may be restricted to a DL standalone SF (at a specific time). Here, the DL standalone SF means an SF on which UL grant is not transmitted but only DL grant is transmitted.

For example, by restricting the DL SF #m, on which the DL grant or UL grant is transmitted, to a DL SF (at a specific time), which is not resource X, that is, the use of which is fixed or set based on the SIB, DL grant or UL grant may be transmitted regardless of change in use of the resource X.

Additionally, if this method is applied, the UE only performs blind decoding of the DL grant or UL grant indicating use and scheduling information of resource X with respect to the DL SF and the eNB may notify the UE that DL grant or UL grant transmitted on a specific SF indicates use and scheduling information of resource X at a specific time (that is, SF #n) using a specific field of the above-described PDCCH (or ePDCCH).

Figure 11:
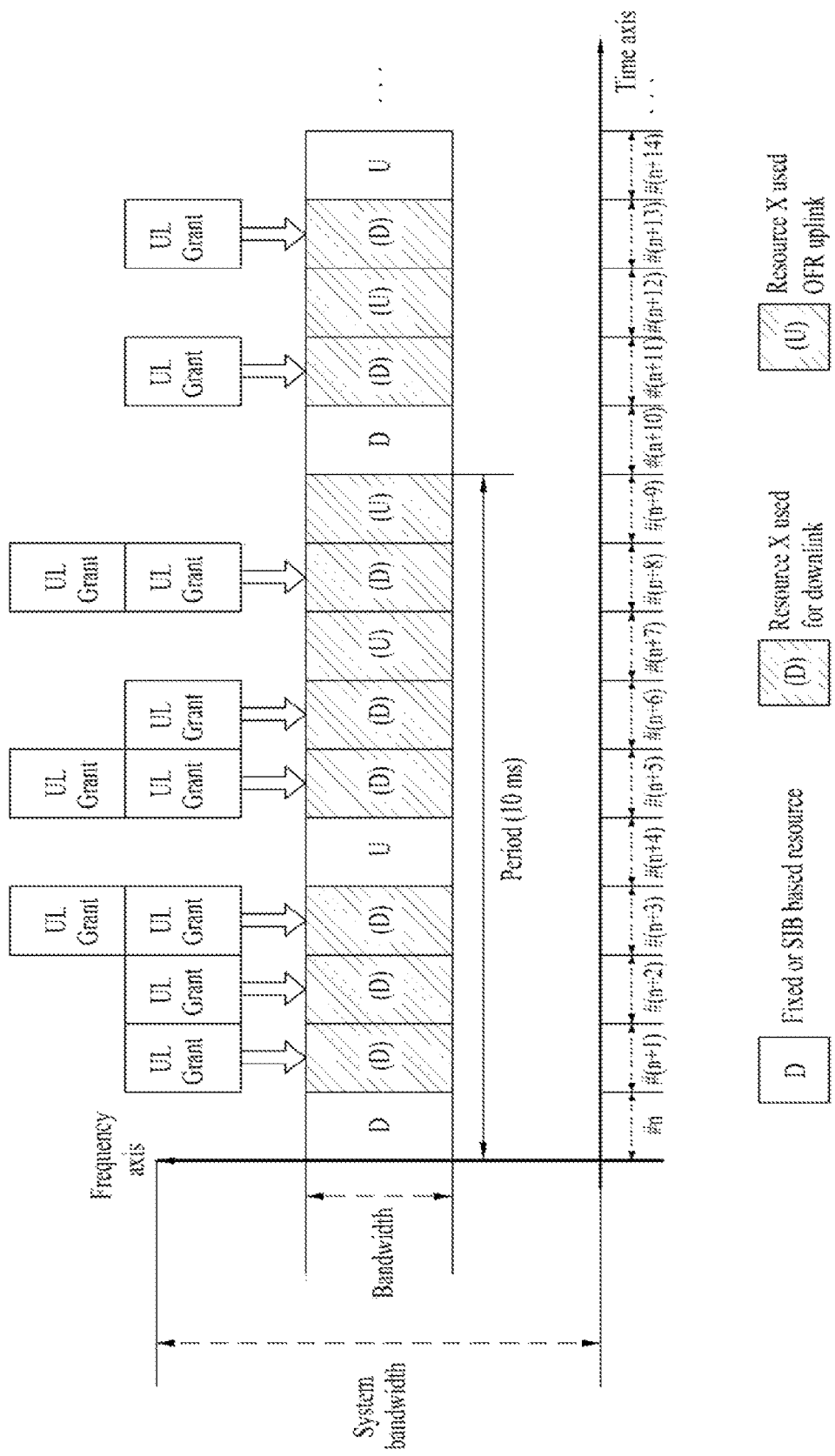
FIG. 11 is a diagram illustrating an example of specifying use of resource X according to a first embodiment of the present invention when resource X is defined in a time-frequency domain.

FIG. 11 is a diagram illustrating an example of specifying use of resource X according to a first embodiment of the present invention when resource X is defined in the time-frequency domain. In particular, in FIG. 11, assume that the time interval of each resource is 1 SF (that is, 1 ms) and use of specific resource is repeated with a period of 1 radio frame (that is, 10 ms). In addition, assume that the eNB transmits DL grant to the UE on the SF #n in order to set use of resource X (that is, SF #n) to a downlink resource, and transmits UL grant on SF #(n−4) in order to set use of resource X (that is, SF #n) to an uplink resource.

Referring to FIG. 11, it can be seen that SF #n, SF #(n+4), SF #(n+10) and SF #(n+14) are fixed to DL, UL, DL and UL, respectively.

In FIG. 11, SF #(n+1), SF #(n+2), SF #(n+3), SF #(n+5), SF #(n+6), SF #(n+7), SF #(n+8), SF #(n+9), SF #(n+11), SF #(n+12) and SF #(n+13) are set to resource X and may be respectively used as DL, DL, DL, DL, DL, UL, DL, UL, DL, UL and DL according to DL grant or UL grant associated therewith.

Second Embodiment

Hereinafter, a method of transmitting UL ACK/NACK information when the first embodiment is applied and a radio resource (that is, resource X), the use of which is not fixed, is used as a downlink resource will be described. That is, if resource X is used as a downlink resource (DL SF #n), UL ACK/NACK transmission of a UE will be described.

a) The UE may transmit UL ACK/NACK for downlink data received from the eNB via resource X (or resource fixed to a DL SF or resource set to a DL SF based on the SIB) at a specific time (DL SF #n) on closest UL SF #p after SF #n simultaneously satisfying "p≥(n+4)" and "UL SF which is not resource X (that is, resource fixed to a UL SF or set to a UL SF based on the SIB)".

Alternatively, UL ACK/NACK for downlink data may be transmitted on closest UL SF #p after SF #n simultaneously satisfying "p≥(n+4)" and "resource X (at a specific time) used as a UL SF" or may be transmitted on closest UL SF #p after SF #n which satisfies "p≥(n+4)" and is "resource X (at a specific time) used as a UL SF and UL SF which is not resource X".

For example, by restricting the UL SF #p, on which the UL ACK/NACK is transmitted, to the "UL SF which is not resource X" (that is, resource fixed to a UL SF or resource set to a UL SF based on the SIB), the UL ACK/NACK may be transmitted regardless change in use of the resource X. In addition, if SF #p is set to resource X, SF #p may be preset to an uplink resource in order to support such operation.

b) The UE may transmit UL ACK/NACK for downlink data received via the resource X (or resource fixed to a DL SF or resource set to a DL SF based on the SIB) at a specific time (DL SF #n) from the eNB using existing UL ACK/NACK timing.

For example, the UE may use closest UL ACK/NACK timing ensuring UL ACK/NACK transmission after SF #n while satisfying "p≥(n+4)" for UL ACK/NACK transmission on a UL SF #p of downlink data received via the resource X which is DL SF #n (or a closest time after SF #n satisfying "p≥(n+4)" among UL ACK/NACK timings based on a specific uplink-downlink configuration set via the SIB).

SF #p used for ACK/NACK transmission means an SF which may be used as an uplink resource (e.g., an SF excluding a DL SF (at a specific time), the use of which is fixed (or set based on existing SIB)).

If SF #p is resource X, SF #p may be preset to an uplink resource in order to support such operation. In addition, SF #p may be restricted to a "UL SF (at a specific time) which is not resource X, that is, the use of which is fixed or set based on the SIB, or "resource X (at a specific time) used as a UL SF" or may be restricted to "resource X (at a specific time) used as a UL SF and a UL SF (at a specific time) which is not resource X, that is, the use of which is fixed.

c) Additionally, UL ACK/NACK for downlink data may be transmitted via the same band as a band used to transmit downlink data or another preset band.

d) When the UE receives downlink data from the eNB via resource X on DL SF #n and, at the same time, receives UL grant on DL SF #n, the UE may transmit UL ACK/NACK for the downlink data using PUCCH resource linked to a lowest index of a control channel element (CC) of UL grant. Alternatively, when the UE receives downlink data from the eNB via resource X on DL SF #n, the UE may transmit UL ACK/NACK for the downlink data using PUCCH resource linked to a lowest index of a CCE of UL grant received at a closest previous time, including DL SF #n.

Third Embodiment

Hereinafter, a method of transmitting DL ACK/NACK, that is, physical hybrid ARQ indicator channel (PHICH) information, when the first embodiment is applied and radio resource (that is, resource X), the use of which is not fixed, is used as an uplink resource will be described. That is, if resource X is used as an uplink resource (UL SF #n), PHICH transmission of an eNB will be described.

A) The eNB may transmit a PHICH for uplink data received from the UE via resource X (or resource fixed to a UL SF or resource set to a UL SF based on the SIB) at a specific time (UL SF #n) on closest DL SF #g after SF #n simultaneously satisfying "g≥(n+4)" and "DL SF which is not resource X (that is, resource fixed to a UL SF or set to a UL SF based on the SIB)".

Alternatively, a PHICH for uplink data may be transmitted on closest DL SF #g after SF #n simultaneously satisfying "g≥(n+4)" and "resource X (at a specific time) used as a DL SF. In addition, a PHICH for uplink data may be transmitted on closest UL SF #g after SF #n which satisfies "g≥(n+4)" and is "resource X (at a specific time) used as a DL SF and a DL SF (at a specific time) which is not resource X".

For example, by restricting DL SF #g, on which the PHICH is transmitted, to resource which is not resource X (that is, resource fixed to a DL SF or resource set to a DL SF based on the SIB), the PHICH may be transmitted regardless of change in use of resource X. In addition, if SF #g is set to resource X, SF #g may be preset to a downlink resource in order to support such operation.

B) The eNB may transmit the PHICH for uplink data received from the UE via resource X (or resource fixed to a UL SF or set to a UL SF based on the SIB) at a specific time (UL SF #n) using existing PHICH timing.

For example, the eNB may use closest PHICH timing ensuring PHICH transmission after SF #n while satisfying "g≥(n+4)" for PHICH transmission on DL SF #g for the uplink data received via resource X which is UL SF #n.

Here, SF #g used for PHICH transmission means an SF which may be used as a downlink resource (excluding a UL SF (at a specific time), the use of which is fixed (or set based on the SIB)).

In addition, If SF #g is resource X, SF #g may be preset to a downlink resource in order to support such operation. In addition, SF #g may be restricted to a "DL SF (at a specific time) which is not resource X, that is, the use of which is fixed or set based on the SIB, or "resource X (at a specific time) used as a DL SF" or may be restricted to "resource X (at a specific time) used as a DL SF and a DL SF (at a specific time) which is not resource X, that is, the use of which is fixed.

C) The eNB may not transmit the PHICH containing ACK information when uplink data transmitted from the UE is successfully received according to a predefined rule shared with the UE. That is, when PHICH discontinuous transmission (DTC) occurs when the PHICH for the uplink data is received, the UE assumes that uplink data transmission is successful (that is, ACK) and reports ACK to a higher layer. In contrast, when decoding of uplink data received from the UE fails, the eNB transmits a PHICH containing NACK information for the uplink data and the UE retransmits the uplink data.

D) Additionally, the PHICH for the uplink data may be transmitted via the same band as a band used to transmit uplink data or another preset band.

Figure 12:
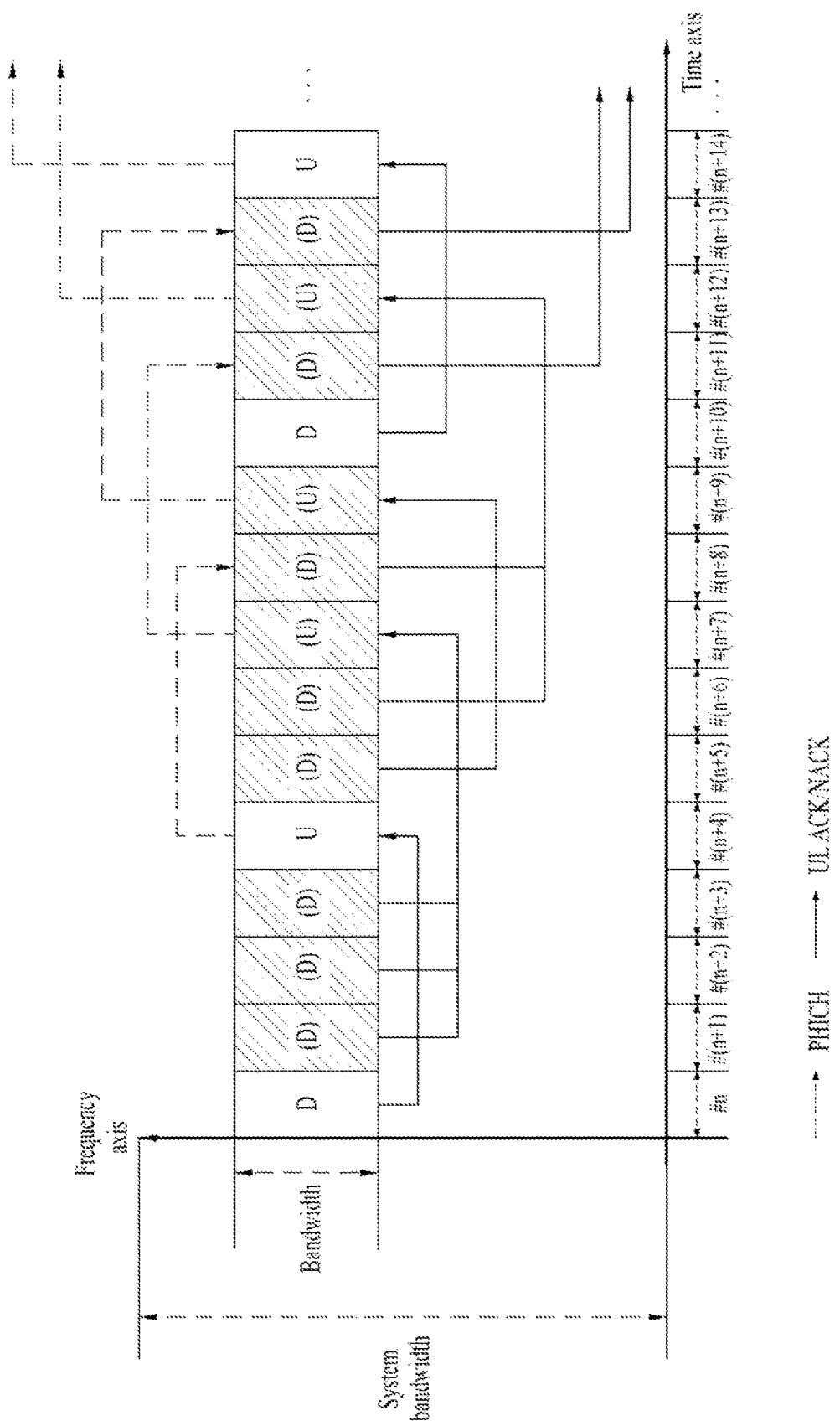
FIG. 12 is a diagram illustrating an example of timings of UL ACK/NACK or PHICH according to second and third embodiments when downlink data or uplink data is transmitted and received via resource, the use of which is set according to the present invention.

FIG. 12 is a diagram illustrating an example of timings of UL ACK/NACK or PHICH according to second and third embodiments when downlink data or uplink data is transmitted and received via resource, the use of which is set according to the present invention.

In particular, in FIG. 12, if the use of SF #n is set to a downlink resource and downlink data is transmitted on the SF, assume that UL ACK/NACK linked thereto is transmitted on a subsequent closest UL SF including SF #(n+4). In addition, if the use of SF #n is set to an uplink resource and uplink data is transmitted on the SF, assume that a PHICH linked thereto is transmitted a subsequent closest DL SF including SF #(n+4).

Assume that UL ACK/NACK or PHICH for downlink data or uplink data received via resource X is transmitted via "resource X used as a UL SF or DL SF and a UL SF or DL SF which is not resource X but the use of which is set based on the SIB or fixed".

Figure 13:
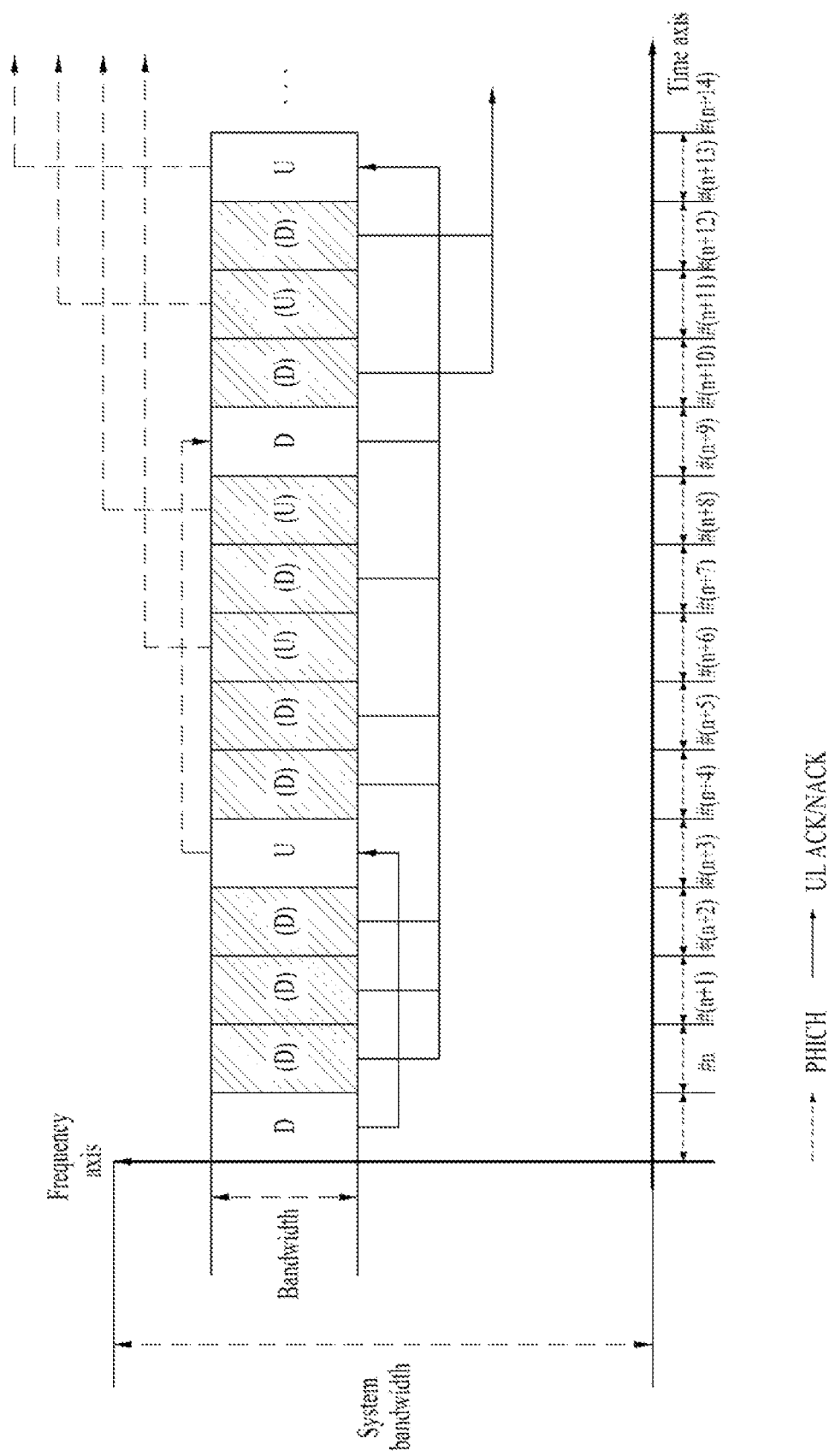
FIG. 13 is a diagram illustrating another example of timings of UL ACK/NACK or PHICH according to second and third embodiments when downlink data or uplink data is transmitted and received via resource, the use of which is set according to the present invention.

FIG. 13 is a diagram illustrating another example of timings of UL ACK/NACK or PHICH according to second and third embodiments when downlink data or uplink data is transmitted and received via resource, the use of which is set according to the present invention.

In particular, in FIG. 13, if the use of SF #n is set to a downlink resource and downlink data is transmitted on the SF, assume that UL ACK/NACK linked thereto is transmitted on a subsequent closest "UL SF which is not resource X, that is, the use of which is fixed or set based on the SIB", including SF #(n+4). In addition, if the use of SF #n is set to an uplink resource and uplink data is transmitted on the SF, assume that a PHICH linked thereto is transmitted a subsequent closest DL SF "which is not resource X, that is, the use of which is fixed to a DL SF or set to a DL SF based on the SIB" including SF #(n+4).

Fourth Embodiment

Additionally, in consideration of propagation delay of data (signal) transmission according to a distance between an eNB and a UE, a shortened DL SF (or shortened UL SF), the length of which is relatively less than the length of a normal DL SF (or UL SF), may be newly defined.

Such a method can solve or prevent a problem that, when SF #n is used as a downlink resource and SF #(n+1) is used as a downlink resource, a downlink data transmission region of SF #n and an uplink data transmission region of SF #(n+1) overlap due to propagation delay between the eNB and the UE and an Rx-Tx switching time.

For example, if resource X is configured over three contiguous SFs (that is, SF #n, SF #(n+1) and SF #(n+2)) in the time-frequency domain (assume that a time interval for resource X is 1 SF (that is, 1 ms)) and SF #n and SF #(n+2) are respectively set to a downlink resource and uplink resource, SF #(n+1) may be set to a shortened DL SF (or shortened UL SF) in consideration of propagation delay between the eNB and the UE.

The eNB may notify the UE of the purpose (that is, downlink resource or uplink resource) of a plurality of radio resources (that is, resource X), the use of which is fixed, via transmission of one DL grant or UL grant.

In addition, the above-proposed methods are applicable to the case in which radio resource (e.g., bandwidth, subframe or a combination thereof), the use of which is not fixed, is set and used in an environment to which a carrier aggregation scheme is applied.

Additionally, the above-proposed methods are applicable to the case in which, when a new carrier type (NCT) carrier and/or an extension carrier is used for a carrier aggregation scheme, the NTC carrier or the extension carrier is set and used as radio resource, the use of which is not fixed. The proposed methods are applicable to the case in which resource is used for device-to-device (D2D) in a D2D communication environment. The proposed methods are applicable to an environment in which E-PDCCH based control information transmission as well as PDCCH based control information transmission is performed.

Figure 14:
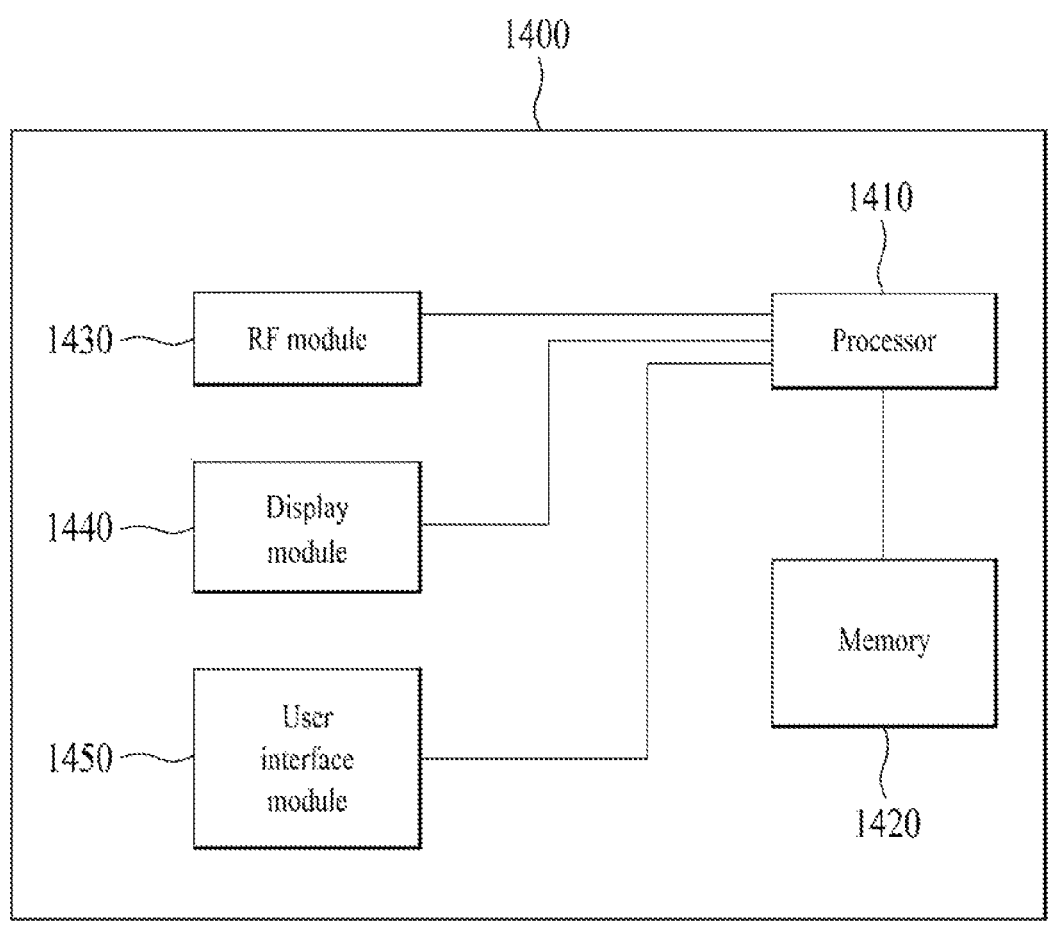
FIG. 14 is a block diagram of a communication apparatus according to one embodiment of the present invention.

FIG. 14 is a block diagram of a communication apparatus according to one embodiment of the present invention.

Referring to FIG. 14, a communication apparatus 1400 includes a processor 1410, a memory 1420, a Radio Frequency (RF) module 1430, a display module 1440 and a user interface module 1450.

The communication apparatus 1400 is shown for convenience of description and some modules thereof may be omitted. In addition, the communication apparatus 1400 may further include necessary modules. In addition, some modules of the communication apparatus 1400 may be subdivided. The processor 1410 is configured to perform an operation of the embodiment of the present invention described with reference to the drawings. For a detailed description of the operation of the processor 1410, reference may be made to the description associated with FIGS. 1 to 13.

The memory 1420 is connected to the processor 1410 so as to store an operating system, an application, program code, data and the like. The RF module 1430 is connected to the processor 1410 so as to perform a function for converting a baseband signal into a radio signal or converting a radio signal into a baseband signal. The RF module 1430 performs analog conversion, amplification, filtering and frequency up-conversion or inverse processes thereof. The display module 1440 is connected to the processor 1410 so as to display a variety of information. As the display module 1440, although not limited thereto, a well-known device such as a Liquid Crystal Display (LCD), a Light Emitting Diode (LED), or an Organic Light Emitting Diode (OLED) may be used. The user interface module 1450 is connected to the processor 1410 and may be configured by a combination of well-known user interfaces such as a keypad and a touch screen.

The above-described embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

The embodiments of the present invention can be implemented by a variety of means, for example, hardware, firmware, software, or a combination thereof. In the case of implementing the present invention by hardware, the present invention can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Although an example in which a method for transmitting and receiving a signal based on dynamic change in radio resource in a wireless communication system and an apparatus for the same is applied to a 3GPP LTE system is described, the present invention is applicable to various wireless communication systems in addition to the 3GPP LTE system.

The invention claimed is:

1. A method for, at a user equipment, transmitting and receiving a signal to and from a base station in a wireless communication system, the method comprising:
   acquiring at least one of downlink grant and uplink grant in a specific subframe;
   determining use of a dynamic subframe, which is dynamically changeable, as one of uplink transmission or downlink reception based on the acquired grant information; and
   transmitting and receiving the signal to and from the base station according to the determined use.

2. The method of claim 1, wherein the determining the use of the dynamic subframe includes determining the use of the dynamic subframe as downlink reception when the downlink grant is acquired in the specific subframe.

3. The method of claim 2, wherein, when an index of the dynamic subframe is n, an index m of the specific subframe is at least one of m, n or n−1.

4. The method of claim 1, wherein the determining the use of the dynamic subframe includes determining the use of the dynamic subframe as uplink reception when the uplink grant is acquired in the specific subframe.

5. The method of claim 4, wherein, when an index of the dynamic subframe is n, an index m of the specific subframe is n−4.

6. The method of claim 1, wherein, when the specific subframe is the dynamic subframe, the specific subframe is determined as downlink reception in advance.

7. The method of claim 1, wherein the specific subframe is determined to be used for downlink by a system information block (SIB).

8. The method of claim 1, further comprising receiving pattern information of the dynamic subframe, the use of which is dynamically changeable, from the base station.

9. The method of claim 8, wherein the pattern information of the dynamic subframe is received via one of a system information block (SIB), radio resource control (RRC) layer signaling and physical layer signaling.

10. A user equipment (UE) apparatus in a wireless communication system, the UE apparatus comprising:
- a wireless communication module configured to transmit and receive a signal to and from a base station; and
- a processor configured to process the signal,
- wherein the processor:
  - acquires at least one of downlink grant and uplink grant in a specific subframe and determines use of a dynamic subframe, which is dynamically changeable, as one of uplink transmission or downlink reception based on the acquired grant information, and
  - controls the wireless communication module to transmit and receive the signal to and from the base station according to the determined use.

11. The UE apparatus of claim 10, wherein the processor determines the use of the dynamic subframe as downlink reception when the downlink grant is acquired in the specific subframe.

12. The UE apparatus of claim 11, wherein, when an index of the dynamic subframe is n, an index m of the specific subframe is at least one of m, n or n−1.

13. The UE apparatus of claim 10, wherein the processor determines the use of the dynamic subframe as uplink reception when the uplink grant is acquired in the specific subframe.

14. The UE apparatus of claim 13, wherein, when an index of the dynamic subframe is n, an index m of the specific subframe is n−4.

15. The UE apparatus of claim 10, wherein, when the specific subframe is the dynamic subframe, the specific subframe is determined as downlink reception in advance.

16. The UE apparatus of claim 10, wherein the specific subframe is determined to be used for downlink by a system information block (SIB).

17. The UE apparatus of claim 10, wherein the wireless communication module receives pattern information of the dynamic subframe, the use of which is dynamically changeable, from the base station.

18. The UE apparatus of claim 17, wherein the pattern information of the dynamic subframe is received via one of a system information block (SIB), radio resource control (RRC) layer signaling and physical layer signaling.

* * * * *